United States Patent
Perumal et al.

(10) Patent No.: US 8,984,624 B2
(45) Date of Patent: Mar. 17, 2015

(54) RESOURCE ACCESS BASED ON MULTIPLE SCOPE LEVELS

(71) Applicant: Microsoft Corporation, Redmond, WA (US)

(72) Inventors: Raja P. Perumal, Issaquah, WA (US); Jeffrey B. Hamblin, Issaquah, WA (US); Paul J. Leach, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/910,846

(22) Filed: Jun. 5, 2013

(65) Prior Publication Data

US 2013/0269025 A1  Oct. 10, 2013

Related U.S. Application Data (63) Continuation of application No. 12/684,426, filed on Jan. 8, 2010, now Pat. No. 8,464,319.

(51) Int. Cl.
*H04L 29/06* (2006.01)
*G06F 21/30* (2013.01)
*G06F 21/62* (2013.01)

(52) U.S. Cl.
CPC ............ *G06F 21/30* (2013.01); *G06F 21/6218* (2013.01); *G06F 2221/2113* (2013.01); *G06F 2221/2141* (2013.01)
USPC ................................................. 726/17; 726/4

(58) Field of Classification Search
CPC ................ G06F 21/30; G06F 21/6218; G06F 2221/2145
USPC .......................................................... 726/4, 17
See application file for complete search history.

(56) References Cited

U.S. PATENT DOCUMENTS

| | | | |
|---|---|---|---|
| 5,136,712 A | 8/1992 | Perazzoli, Jr. et al. |
| 5,797,128 A | 8/1998 | Birnbaum |
| 6,014,666 A | 1/2000 | Helland et al. |
| 6,064,656 A | 5/2000 | Angal et al. |
| 6,237,036 B1 | 5/2001 | Ueno et al. |
| 6,779,120 B1 | 8/2004 | Valente |
| 7,016,893 B2 | 3/2006 | Boreham et al. |
| 8,464,319 B2 | 6/2013 | Perumal et al. |
| 2003/0131073 A1 | 7/2003 | Lucovsky |
| 2004/0243835 A1 | 12/2004 | Terzis et al. |
| 2006/0041929 A1 | 2/2006 | Della-Libera et al. |

(Continued)

OTHER PUBLICATIONS

"Final Office Action", U.S. Appl. No. 12/684,426, (Dec. 13, 2012), 5 pages.

(Continued)

*Primary Examiner* — Harunur Rashid
*Assistant Examiner* — Dao Ho
(74) *Attorney, Agent, or Firm* — Timothy Churna; Kate Drakos; Micky Minhas (57) ABSTRACT

A scope hierarchy corresponding to a resource to which a type of access is requested is identified, the scope hierarchy including multiple scope levels each of which has an associated access control list. An access control list associated with a lower scope level can further restrict access permitted to the resource by an access control list associated with a higher scope level. Based at least in part on one or more of the access control lists associated with the multiple scope levels, a determination is made as to whether the requested type of access to the resource is permitted.

16 Claims, 5 Drawing Sheets

(56) References Cited

U.S. PATENT DOCUMENTS

| | | | |
|---|---|---|---|
| 2006/0294578 A1 | 12/2006 | Burke et al. | |
| 2007/0214497 A1* | 9/2007 | Montgomery et al. | 726/4 |
| 2007/0283443 A1 | 12/2007 | McPherson et al. | |
| 2009/0150824 A1 | 6/2009 | Furuichi | |
| 2009/0172789 A1 | 7/2009 | Band et al. | |
| 2011/0173679 A1 | 7/2011 | Perumal | |

OTHER PUBLICATIONS

"Non-Final Office Action", U.S. Appl. No. 12/684,426, (Sep. 17, 2012), 7 pages.

"Notice of Allowance", U.S. Appl. No. 12/684,426, (Feb. 11, 2013), 6 pages.

Gao, Luo "A Toolkit for Automated Fine-Grained Access Control Policy Enforcement in Oracle 9i.", Retrieved from: <http://www.lib.ncsu.edu/theses/available/etd-08152004-232731/unrestricted/etd.pdf> on Oct. 15, 2009, (Aug. 2004), pp. 1-70.

Groenewegen, Danny et al., "Declarative Access Control for WebDSL: Combining Language Integration and Separation of Concerns", *Delft University of Technology Software Engineering Research Group Technical Report Series*, Available at <http://swerl.tudelft.nl/twiki/pub/Main/TechnicalReports/TUD-SERG-2008-021.pdf>,(Jul. 2008), pp. 1-14.

Jaume, Mathieu et al., "A Formal Approach to Implement Access Control Models", Available at <http://www.iist.unu.edu/~morisset/papers/jias06.pdf>,(2006), pp. 1-8.

Miller, Donald V., et al., "Access Control by Boolean Expression Evaluation", *Tandem Computers, Inc.*, Available at <http://ieeexplore.ieee.org/stamp/stamp.jsp?tp=&isnumber=&arnumber=81042>,(1990), pp. 131-139.

Ribeiro, Carlos et al., "SPL: An Access Control Language for Security Policies with Complex Constraints", *In Proceedings of the Network and Distributed System Security Symposium*, Available at <http://www.gsd.inesc-id.pt/~cnr/splii.pdf>,(2001),19 pages.

\* cited by examiner

RESOURCE ACCESS BASED ON MULTIPLE SCOPE LEVELS

RELATED APPLICATIONS

This application is a continuation of and claims priority to U.S. patent application Ser. No. 12/684,426, filed on Jan. 8, 2010, the disclosure of which is incorporated by reference herein.

BACKGROUND

Restricting access to computing resources, such as files in a file system, to particular users is oftentimes desired. One way such restrictions can be enforced is using a resource-centric approach in which owners of the resources control the access control policies of the resources. Although such resource-centric approaches can be beneficial, they are not without their problems. One such problem is that an asset owner (e.g., file system or computer system owner) cannot guarantee restrictions on a resource of the asset because the resource owner has the discretion to change the restrictions on the resource.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a scope hierarchy corresponding to a resource to which a type of access is requested is identified. The scope hierarchy includes multiple scope levels, each scope level having an associated access control list. An access control list associated with a lower scope level can further restrict access permitted to the resource by an access control list associated with a higher scope level. Based at least in part on one or more of the access control lists associated with the multiple scope levels, a determination is made as to whether the requested type of access to the resource is permitted.

BRIEF DESCRIPTION OF THE DRAWINGS

The same numbers are used throughout the drawings to reference like features.

DETAILED DESCRIPTION

Resource access based on multiple scope levels is discussed herein. Resources of a computing device have a corresponding scope hierarchy. The scope hierarchy includes multiple scope levels, with each of the scope levels having an associated access control list. Access control lists of lower scope levels can further restrict access permitted by higher scope levels, but do not result in broadening access restricted by higher scope levels. When a particular type of access to a resource is requested, a determination is made as to whether each of the access control lists associated with scope levels in the scope hierarchy corresponding to the resource permit the particular type of access to the resource. If all such access control list permit the particular type of access to the resource, then the particular type of access to the resource is permitted.

Figure 1:
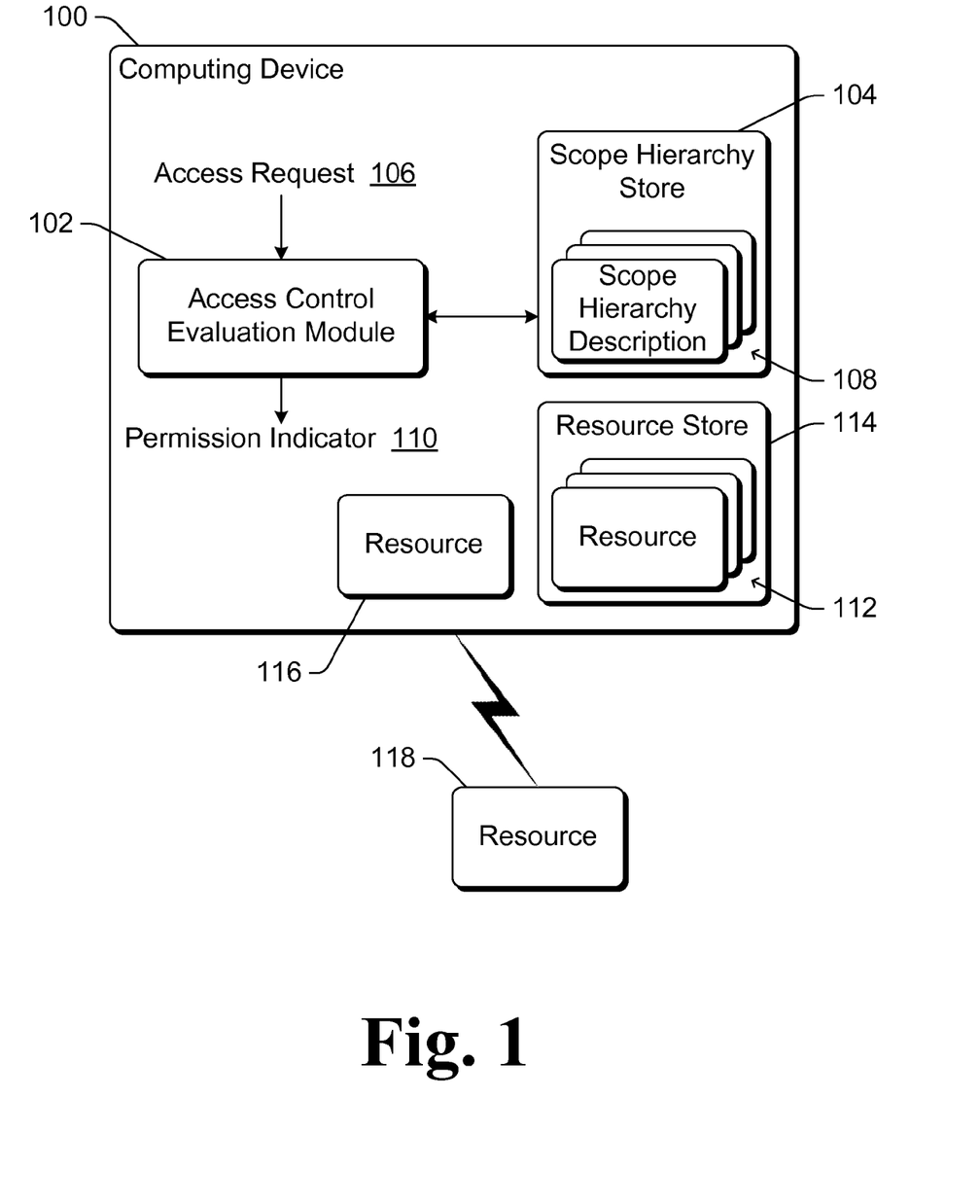
FIG. 1 is a block diagram illustrating an example computing device implementing the resource access based on multiple scope levels in accordance with one or more embodiments.

FIG. 1 is a block diagram illustrating an example computing device 100 implementing the resource access based on multiple scope levels in accordance with one or more embodiments. Computing device 100 can be a variety of different types of computing devices, such as a desktop computer, a server computer, a handheld or laptop computer, a mobile station, an entertainment or other appliance, a set-top box communicatively coupled to a display device, a television, a cellular or other wireless phone, a game console, an automotive computer, and so forth. Thus, computing device 100 may range from a device with substantial memory and processor resources (e.g., personal computers, game consoles) to a device with limited memory and/or processing resources (e.g., traditional set-top boxes, hand-held game consoles).

Computing device 100 includes an access control evaluation module 102 and a scope hierarchy store 104. Access control evaluation module 102 receives requests 106 to access resources, evaluates the access requests based on scope hierarchy descriptions 108 in scope hierarchy store 104, and outputs permission indicators 110 indicating whether the requested type of access is permitted. Scope hierarchy store 104 can be an operating system store (e.g., part of an operating system registry), or alternatively a different store of (or accessible to) computing device 100.

A resource refers to a physical device or other component that can be accessed by a computing device and to which access is controlled. Examples of different types of resources include a file (e.g., storing data and/or instructions) in a file system, a printer, an image capture device, a communication component (e.g., a network adapter or wireless communication program), and so forth. A resource can be included in a resource store of computing device 100, such as resources 112 in resource store 114. A resource can also be included as an individual part of computing device 100 that is separate from resource store 114, such as resource 116. A resource can also be a physically separate device from computing device 100 and/or included as part of (or stored on) another device that is physically separate from computing device 100, such as resource 118. Resource 118 can be coupled to computing device 100 in a wired or wireless manner, and resource 118 can be directly coupled to computing device 100 or coupled to computing device 100 via a network (e.g., a local area network or the Internet).

Access control evaluation module 102 receives a request for a particular type of access to a resource from a requester. A variety of different components or modules of computing device 100 (or alternatively of another device separate from computing device 100) can be a requester. The request can also be generated internally by access control evaluation module 102, in which case module 102 is itself the requester. Access control evaluation module 102 returns permission indicator 110 to the requester, or alternatively to another component or module (e.g., a component or module controlling or storing the resource).

In one or more embodiments, a resource manager (not shown) component or module controlling the resource is the requester. This resource manager identifies to access control evaluation module 102 the resource, the particular type of access to the resource being requested, the scope hierarchy description 108 corresponding to the resource, and an identifier of the user. Alternatively, access control evaluation module 102 can obtain part or all of this information rather than having the resource manager identify the information to module 102.

Access control evaluation module 102 determines whether a particular type of access to a resource that is requested is permitted or prohibited based on scope hierarchy descriptions 108 in scope hierarchy store 104. Each type of resource has a corresponding scope hierarchy description 108. Module 102 can be configured with (e.g., programmed with) an indication of which scope hierarchy description 108 corresponds to a particular type of resource. Alternatively, module 102 can determine which scope hierarchy description 108 corresponds to a particular type of resource in different manners (e.g., based on a record maintained in scope hierarchy store 104 or elsewhere).

Figure 2:
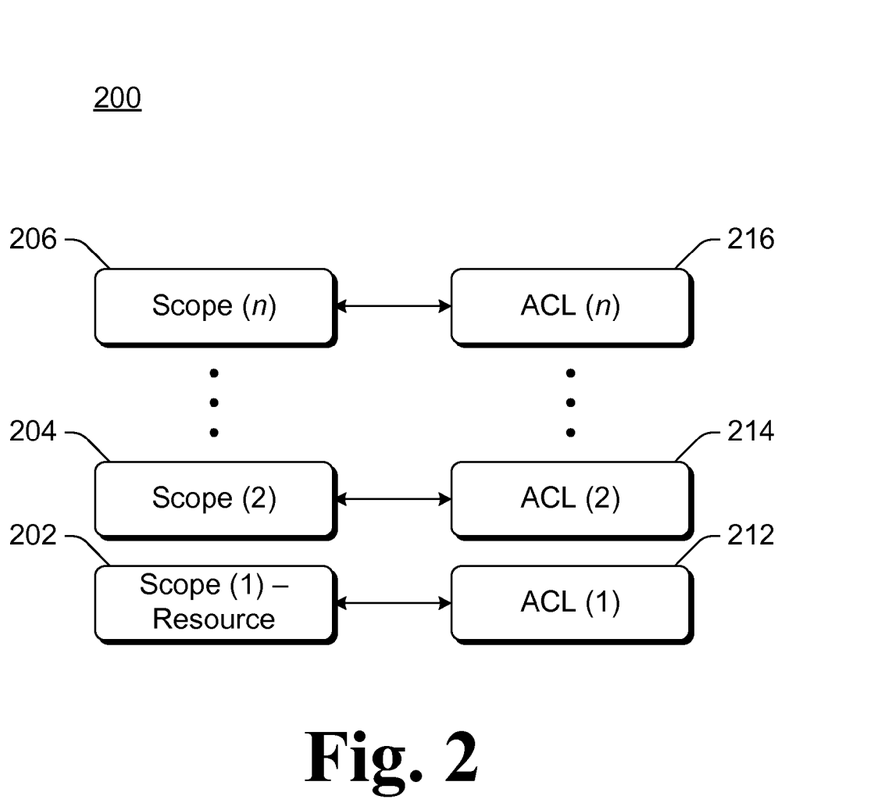
FIG. 2 is a block diagram illustrating an example scope hierarchy in accordance with one or more embodiments.

FIG. 2 is a block diagram illustrating an example scope hierarchy 200 in accordance with one or more embodiments. A scope hierarchy includes two or more scope levels. Each scope level is a different level at which access control policies can be imposed, with the access control policy included at a particular scope level applying to all other lower scope levels. In the example scope hierarchy 200 of FIG. 2, multiple (n) scope levels 202, 204, and 206 are illustrated. A first scope level that is illustrated in scope hierarchy 200 as being below a second scope level is referred to as being a lower scope level than the second scope level. Similarly, a first scope level that is illustrated in scope hierarchy 200 as being above a second scope level is referred to as being a higher scope level than the second scope level. For example, scope level 202 is a lower scope level than scope level 204, and scope level 206 is a higher scope level than scope level 204. Scope level 202 is referred to as the bottom scope level and corresponds to the resource. Scope level 206 is referred to as the top scope level.

Each scope level has an associated access control list (ACL). ACL 212 is associated with scope level 202, ACL 214 is associated with scope level 204, and ACL 216 is associated with scope level 206. Each ACL 212, 214, and 216 includes an access control policy that specifies one or more types of access to resources that are permitted and/or prohibited by particular users (or groups of users). A variety of different types of access can be included in an access control policy, and can vary based on the type of resource. For example, for a resource that is a file, the types of access can include the ability to read the file, the ability write to the file, the ability to delete the file, the ability to rename the file, the ability to copy or move the file, and so forth. By way of another example, for a resource that is a printer, the types of access can include the ability to print to the printer, the ability to read configuration settings of the printer, the ability to write configuration settings to the printer, the ability to re-order jobs being printed by the printer, and so forth. By way of yet another example, for a resource that is an image capture device, the types of access can include the ability to capture an image, the ability to read configuration settings of the image capture device, the ability to write configuration settings to the image capture device, the ability to view images captured by the image capture device, and so forth. Different types of access can be permitted for different users or groups of users.

In one or more embodiments, each ACL 212, 214, and 216 includes an identifier of the ACL associated with the next higher scope level (if any) and an identifier of the ACL associated with the next lower scope level (if any). A correspondence between the ACL associated with bottom scope level 202 and the resource is maintained (e.g., in scope hierarchy store 104 of FIG. 1) so that the appropriate ACL 212 for the resource can be identified. By maintaining the identifiers of the ACLs associated with the next higher and next lower scope levels, the ACLs associated with the scope levels 202, 204, and 206 for the scope hierarchy corresponding to the resource can be readily identified.

Alternatively, the ACLs associated with the scope levels 202, 204, and 206 for the scope hierarchy corresponding to the resource can be identified in other manners. For example, a data structure (e.g., one or more arrays) can be used to store the ACLs in a manner that allows the ACLs associated with the scope levels 202, 204, and 206 for the scope hierarchy corresponding to the resource to be readily identified In order to grant permission for a particular type of access to a requester, that particular type of access needs to be granted at all of the scope levels 202, 204, and 206. Accordingly, the requester is granted permission for a particular type of access to a resource if all of the ACLs 212, 214, and 216 grant permission for the particular type of request. However, if at least one of the ACLs 212, 214, and 216 prohibits that particular type of access to the resource, then permission for that particular type of request is denied. For example, if ACL 212 prohibits that particular type of access to the resource, then that particular type of access to the resource is prohibited regardless of whether ACLs 214 and 216 permit that particular type of access to the resource. By way of another example, if ACL 214 prohibits that particular type of access to the resource, then that particular type of access to the resource is prohibited regardless of whether ACLs 212 and 216 permit that particular type of access to the resource.

In order to determine whether a particular type of access to a resource is permitted or prohibited, access control evaluation module 102 evaluates the access control policies included in one or more of ACLs 212, 214, and 216. Rather than propagating access control policies from one scope level down to lower scope levels, these access control policies are effectively combined together. A particular type of access to the resource is thus permitted only if all of the ACLs 212, 214, and 216 permit the particular type of access. Access control evaluation module 102 can evaluate the access control policies individually, and if an ACL 212, 214, or 216 includes an access control policy indicating that the particular type of access to the resource is prohibited, then module 102 can stop evaluating the access control policies (because the particular type of access to the resource is prohibited). In one or more embodiments module 102 evaluates the access control policies beginning at the bottom scope level of scope hierarchy 200 and working upwards to higher scope levels, although other orders of evaluating the access control policies can alternatively be used.

The individual scope levels 202-206 in scope hierarchy 200 can vary based on the desires of the system designer and based at least in part on the type of resource. For example, for a resource that is a file, scope hierarchy 200 can include the following scope levels in order from lowest level to highest level: resource scope, resource collection scope, resource manager scope, resource manager collection scope, and system scope. The resource scope corresponds to the particular file that is the resource, the resource collection scope corresponds to a collection of files (e.g., a folder that the file is stored in). The resource manager scope corresponds to the file system, and the resource manager collection corresponds to a collection of different types of resources (e.g., files and printers). The system scope corresponds to the overall system in which the file is located (e.g., including one or more computing devices that can request to access the file).

By way of another example, for a resource that is a printer, scope hierarchy 200 can include the following scope levels in order from lowest level to highest level: resource scope, resource manager scope, resource manager collection scope, and system scope. The resource scope corresponds to the particular printer that is the resource, and the resource scope manager corresponds to a collection of printers in the system that includes the printer. The resource manager collection corresponds to a collection of different types of resources (e.g., files and printers), and the system scope corresponds to the overall system in which the printer is located (e.g., including one or more computing devices that can request to access the printer).

It should be noted that the access control policy in the ACL of an associated scope level can further restrict access permitted by a higher scope level, but does not result in broadening of access permitted by a higher scope level. For example, assume the resource is a file, and that the access control policy in ACL 214 indicates that a user is permitted to read the file but is not permitted to write to the file. The access control policy in ACL 212 can indicate that the user is not permitted to read the file, thus resulting in the access permitted by the higher scope level 204 being further restricted. However, the access control policy in ACL 212 cannot result in broadening of access permitted by the higher scope level, so even if the access control policy in ACL 212 were to indicate that the user is permitted to write to the file, the user still would not be permitted to write to the file because the access permitted by the higher scope level 204 prohibits writing to the file. However, it should also be noted that although the access control policy in the ACL can result in further restricting access permitted by a higher scope level, the access control policy in the ACL need not result in further restricting access permitted by a higher scope level.

Additionally, in one or more embodiments the ability to set or change the access control policy for a particular ACL 212-216 is delegated to one or more users or groups of users. An identifier of each user (or group of users) that is permitted to set or change the access control policy for a particular ACL 212-216 is included in the access control policy for that particular ACL 212-216. A control module (such as access control evaluation module 102 of FIG. 1 or alternatively another module) receives user requests to change the access control policy for a particular ACL 212-216. The control module verifies the identity of the user, and then checks the particular ACL 212-216 to determine whether that user is identified as being permitted to change the access control policy. The control module permits the change to the particular ACL 212-216 if the user is identified as being permitted to change the access control policy, but otherwise does not change the access control policy.

It should also be noted that different resources can share parts of the same scope hierarchy 200. Each resource can have its own ACL 212 associated with bottom scope level 202, but ACLs of multiple lower scope levels can refer to (e.g., include a pointer to) the same ACL of a higher scope level. For example, assume the resources are files, and each file has its own ACL 212 associated with bottom scope level 202. The ACL 212 for each file in a particular folder can point to an ACL 214 of a resource collection scope level 204 corresponding to that particular folder. That particular ACL 214, as well as ACLs for other folders on a file server, can then point to an ACL 216 of a resource manager scope level 206 corresponding to the file server.

Figure 3:
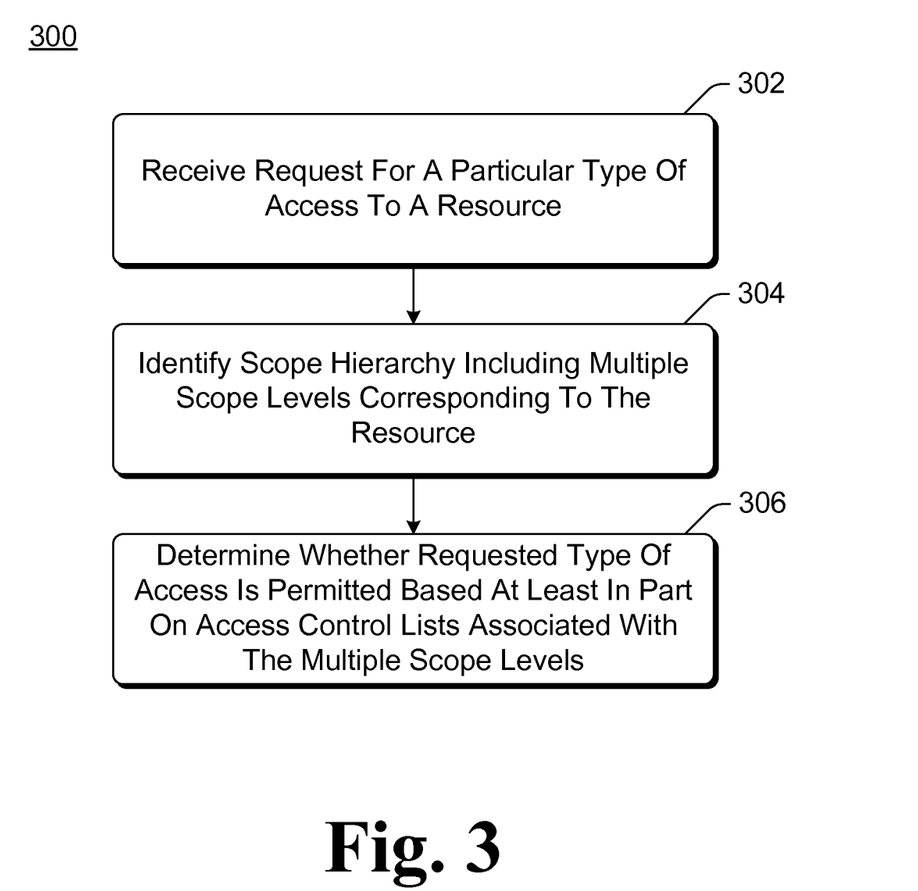
FIG. 3 is a flowchart illustrating an example process for resource access based on multiple scope levels in accordance with one or more embodiments.

FIG. 3 is a flowchart illustrating an example process 300 for resource access based on multiple scope levels in accordance with one or more embodiments. Process 300 is carried out by an access control evaluation module, such as module 102 of FIG. 1, and can be implemented in software, firmware, hardware, or combinations thereof. Process 300 is shown as a set of acts and is not limited to the order shown for performing the operations of the various acts. Process 300 is an example process for resource access based on multiple scope levels; additional discussions of resource access based on multiple scope levels are included herein with reference to different figures.

In process 300, a request for a particular type of access by a user to a resource is received from a requester (act 302). A variety of different types of access can be requested as discussed above, such as access to read a file, write to a file, write configuration settings, and so forth.

In response to the request, a scope hierarchy including multiple scope levels corresponding to the resource is identified (act 304). As discussed above, different resources and different types of resources can correspond to different scope hierarchies.

A determination of whether the requested type of access is permitted is made based at least in part on access control lists associated with the multiple scope levels (act 306). As discussed above, in order to grant permission for a particular type of access to a requester, that particular type of access needs to be granted at all of the scope levels (e.g., scope levels 202, 204, and 206 of FIG. 2). Otherwise, the requested type of access is permitted. An indication of this determination can be returned to the requester or alternatively another component or module as discussed above.

Figure 4:
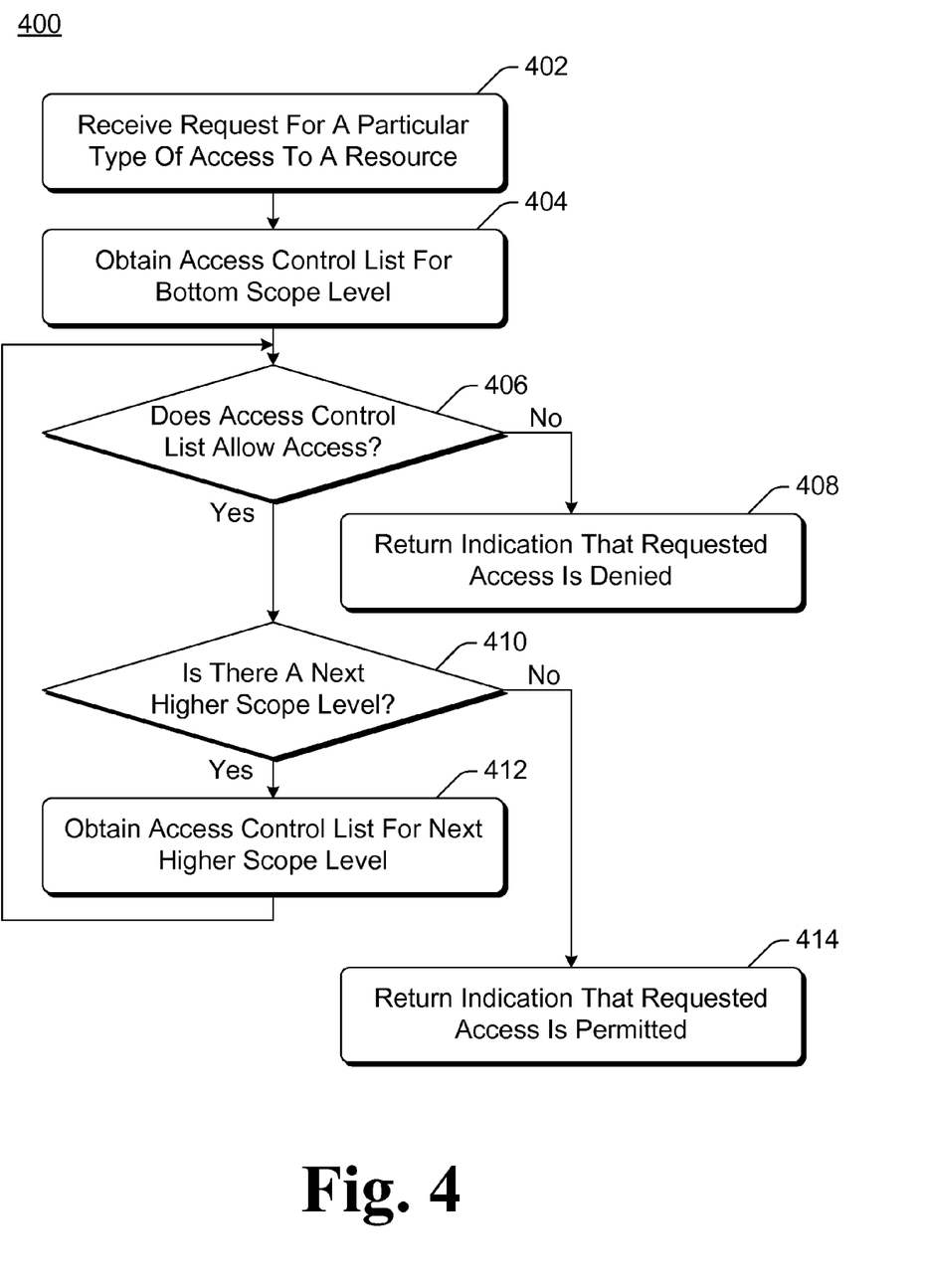
FIG. 4 is a flowchart illustrating an example process for resource access based on multiple scope levels in accordance with one or more embodiments.

FIG. 4 is a flowchart illustrating an example process 400 for resource access based on multiple scope levels in accordance with one or more embodiments. Process 400 is carried out by an access control evaluation module, such as module 102 of FIG. 1, and can be implemented in software, firmware, hardware, or combinations thereof. Process 400 is shown as a set of acts and is not limited to the order shown for performing the operations of the various acts. Process 400 is an example process for resource access based on multiple scope levels; additional discussions of resource access based on multiple scope levels are included herein with reference to different figures.

In process 400, a request for a particular type of access by a user to a resource is received from a requester (act 402). A variety of different types of access can be requested as discussed above, such as access to read a file, write to a file, write configuration settings, and so forth.

An access control list for a bottom scope level of a scope hierarchy is obtained (act 404). This access control list obtained in act 404 is the access control list corresponding to the resource for which access is requested.

A check is made as to whether the obtained access control list allows the requested type of access for the user (act 406). This obtained access control list is the access control list obtained in act 404.

If the obtained access control list does not allow the access for the user, then an indication that the requested access is denied is returned (act 408). This indication can be returned to the requester or alternatively to another component or module as discussed above.

However, if the obtained access control list does allow the access for the user, then a check is made as to whether there is a next higher scope level in the scope hierarchy (act 410).

If there is a next higher scope level in the scope hierarchy, then the access control list for that next higher scope level in the scope hierarchy is obtained (act 412). Process 400 then returns to act 406 to check whether the obtained access control list allows the requested type of access for the user. It should be noted, however, that the obtained access control list now refers to the access control list obtained in act 412 rather than the access control list obtained in act 404.

Returning to act 410, if there is not a next higher scope level in the scope hierarchy (i.e., the obtained access control list is associated with the top scope level), then an indication that the requested access is permitted is returned (act 414). This indication can be returned to the requester or alternatively to another component or module as discussed above.

The resource access based on multiple scope levels discussed herein supports various different usage scenarios. For example, a system administrator can set a particular access control policy in an access control list associated with a resource collection scope level so that all files stored in a particular folder of the file system have that particular access control policy. The system administrator is thus able to restrict the access particular users have to files in that particular folder regardless of the permissions that are given to the files by the creators or owners of the files. By way of another example, a system administrator can set a particular access control policy for all files in a system (e.g., stored on multiple file servers), and thus be assured that that particular access control policy is applied to all files in the system regardless of the permissions that are given to the files by the creators or owners of the files or the file servers on which the files are stored.

By way of yet another example, a system administrator can quickly and easily change access control policy for numerous resources in a system by changing the access control policy in the access control list associated with the top scope level. The changed access control policy need not be propagated to numerous different resources; rather, it is applied by the access control evaluation module simply by being included in the access control list associated with the top scope level. By way of still another example, a system administrator can quickly verify that a particular access control policy is in place across a particular system or portion thereof by accessing and reviewing the access control policy in the access control list associated with the system scope level (or the scope level of the desired portion of the system). If the particular access control policy is in that access control list, then the system administrator knows that that particular access control policy will be enforced by the access control evaluation module.

Figure 5:
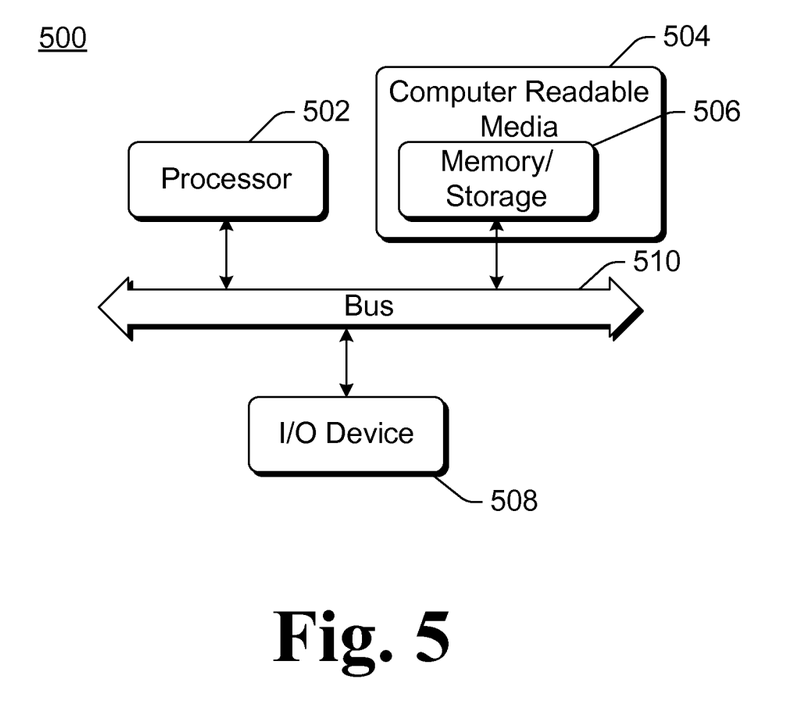
FIG. 5 illustrates an example computing device that can be configured to implement the resource access based on multiple scope levels in accordance with one or more embodiments.

FIG. 5 illustrates an example computing device 500 that can be configured to implement the resource access based on multiple scope levels in accordance with one or more embodiments. Computing device 500 can be, for example, computing device 100 of FIG. 1.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or one or more I/O devices 508 can be included as part of, or alternatively may be coupled to, computing device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or non-volatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 5. The features of the resource access based on multiple scope levels techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device comprising:
   one or more hardware processors;
   one or more computer-readable storage media storing instructions which, when executed by the one or more processors, perform operations comprising:
      identifying a scope hierarchy corresponding to a resource to which a type of access is requested, the scope hierarchy including multiple scope levels each having an associated access control list, and wherein an access control list associated with a lower scope level can further restrict access permitted to the resource by an access control list associated with a higher scope level; and
      determining, based at least in part on one or more of the access control lists associated with the multiple scope levels, whether the requested type of access to the resource is permitted,
   wherein the determining comprises:
      accessing a first scope level of the multiple scope levels corresponding to the resource;
      determining whether a first access control list associated with the first scope level prohibits the requested type of access;
      determining that the requested type of access to the resource is not permitted if the first access control list prohibits the requested type of access;
      accessing a next higher scope level of the multiple scope levels if the first access control list does not prohibit the requested type of access;
      determining whether a second access control list associated with the next higher scope level prohibits the requested type of access;
      determining that the requested type of access to the resource is not permitted if the second access control list prohibits the requested type of access;
      repeatedly accessing next higher scope levels of the multiple scope levels and determining if the access control list associated with the next higher scope level prohibits the requested type of access; and
      determining, if a top scope level of the multiple scope levels does not prohibit the requested type of access, that the requested type of access to the resource is permitted.

2. A computing device as recited in claim 1, wherein for each of the multiple scope levels, an access control list associated with the scope level can further restrict but cannot result in broadening access permitted by an access control list associated with a higher scope level.

3. A computing device as recited in claim 1, wherein the resource comprises a file.

4. A computing device as recited in claim 3, wherein the scope hierarchy includes a first scope corresponding to the file, a second scope at a higher level than the first scope and corresponding to a file folder, and a third scope at a higher level than the second scope and corresponding to a file system.

5. A computing device as recited in claim 3, wherein one or more scope levels of the multiple scope levels correspond to multiple files stored on multiple file servers.

6. A computing device as recited in claim 1, wherein the resource comprises a printer.

7. A computing device as recited in claim 1, wherein each of the access control lists associated with the multiple scope levels includes an identifier of a user that is permitted to change an access control policy of the access control list.

8. A computing device as recited in claim 1, wherein the resource is included as part of the computing device.

9. A computer-implemented method comprising:
   using, by a computing device, a scope hierarchy store to store one or more scope hierarchy descriptions each corresponding to one of one or more resources, each of the one or more scope hierarchy descriptions including multiple scope levels each having an associated access control list, and wherein an access control list associated with a lower scope level can further restrict access permitted to the resource by an access control list associated with a higher scope level; and
   determining, by the computing device and based at least in part on one or more of the access control lists associated with the multiple scope levels of a scope hierarchy description, whether a requested type of access to one of the one or more resources is permitted,
   wherein determining whether a requested type of access to one of the one or more resources is permitted comprises:
      accessing a first scope level of the multiple scope levels corresponding to the one resource;
      determining whether a first access control list associated with the first scope level prohibits the requested type of access;
      determining that the requested type of access to the one resource is not permitted if the first access control list prohibits the requested type of access;
      accessing a next higher scope level of the multiple scope levels if the first access control list does not prohibit the requested type of access
      determining whether a second access control list associated with the next higher scope level prohibits the requested type of access;
      determining that the requested type of access to the one resource is not permitted if the second access control list prohibits the requested type of access;
      repeatedly accessing next higher scope levels of the multiple scope levels and determine if the access control list associated with the next higher scope level prohibits the requested type of access; and
      determining, if a top scope level of the multiple scope levels does not prohibit the requested type of access, that the requested type of access to the one resource is permitted.

10. A computer-implemented method as recited in claim 9, wherein for each of the multiple scope levels, an access control list associated with the scope level can further restrict but cannot result in broadening access permitted by an access control list associated with a higher scope level.

11. A computer-implemented method as recited in claim 9, wherein the one resource comprises a file.

12. A computer-implemented method as recited in claim 11, wherein the multiple scope levels of the scope hierarchy description include a first scope corresponding to the file, a second scope at a higher level than the first scope and corresponding to a file folder that stores the one file, and a third scope at a higher level than the second scope and corresponding to a file system that stores the file folder.

13. A computer-implemented method as recited in claim 9, wherein one of the one or more resources comprises a printer.

14. A computer-implemented method as recited in claim 9, wherein each of the access control lists associated with the multiple scope levels includes an identifier of a user that is permitted to change an access control policy of the access control list.

15. A computer-implemented method as recited in claim 9, wherein the computing device includes the one resource.

16. A computer-implemented method comprising:
receiving, with a computing device, a request for a particular type of access to a resource, the resource having a corresponding scope hierarchy including multiple scope levels;
obtaining, via the computing device, an access control list for a bottom scope level of the multiple scope levels;
checking, via the computing device, whether the access control list for the bottom scope level allows the particular type of access to the resource;
when the access control list for the bottom scope level does not allow the particular type of access to the resource, then returning, via the computing device, an indication that the requested access is denied; and
when the access control list for the bottom scope level does allow the particular type of access to the resource, then using the computing device to:
repeatedly check whether there is a next higher scope level in the multiple scope levels; and
after each check of whether there is a next higher scope level in the multiple scope levels, if there is a next higher scope level then obtain the next higher scope level and return an indication that the requested access is denied if an access control list for the next higher scope level does not allow the particular type of access to the resource, and if there is no next higher scope level then return an indication that the requested access is permitted.

* * * * *